March 14, 1950  J. ROCHAT  2,500,380
METHOD OF MAKING WELDRODS
Filed Jan. 27, 1948
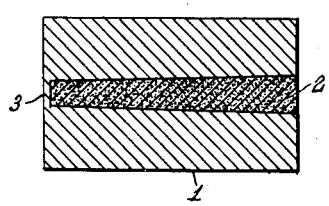
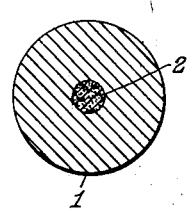
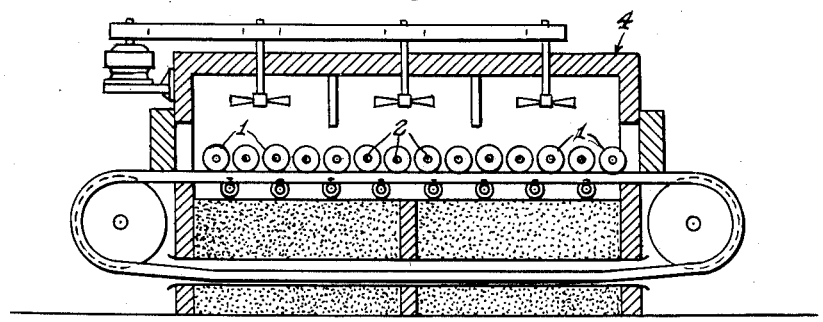
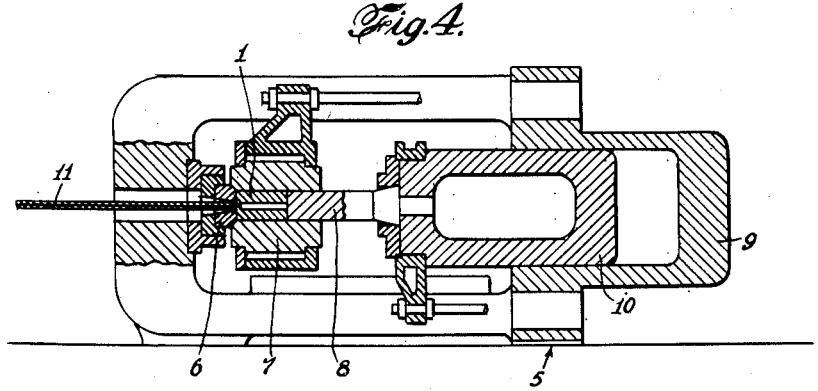
INVENTOR.
JEAN ROCHAT
BY
ATTORNEY.

Patented Mar. 14, 1950

2,500,380

UNITED STATES PATENT OFFICE 2,500,380

METHOD OF MAKING WELD RODS

Jean Rochat, Mont-La-Ville, Switzerland

Application January 27, 1948, Serial No. 4,721
In Switzerland March 22, 1947

2 Claims. (Cl. 219—8)

In the welding or brazing of non-ferrous metals, for instance of aluminum and aluminum alloys, the work cannot be carried out properly and the result does not answer the purpose as to the required mechanical properties of the finished article if the operation is not executed in presence of fluxes, which vary from one metal to the other and are spread as a powder or as a solution over the parts of the articles which have to be bonded and over the welding or brazing rod.

One has already proposed to introduce the flux into the rod in order to avoid its handling which always leads to great losses. For that purpose one has already spread the flux over a metal sheet which was then rolled up to a tube with the flux in its interior. One obtained nearly the same result by introducing the flux into the longitudinal groove of a profiled rod, the groove being closed after filling by a squeezing operation. Both methods however raised the original cost of the welding or brazing rods, so that these never could be introduced to the consumers.

The method according to the present invention enables the manufacture of flux-containing welding and brazing rods, the original cost of which being practically the same as that of the usual rods although they present the advantages of rods containing flux in their interior. The new method is characterized by the fact that a flux is enclosed in the interior of a cast ingot and that the ingot is then transformed to rods by mechanical working. In order to obtain such a product, one may proceed as follows with aluminum:

One provides one or more longitudinal cavities in the ingot during the casting, for instance by means of an iron core. The volume of these cavities relatively to the volume of the ingot should be in a relation corresponding to the volume of the flux which must be contained by the finished rod. After having carried out that operation, one closes the opening through which the flux has been introduced, either with a plug made from the same metal or by another method, and submits the ingot to a mechanical working in order to transform it by degrees to rods. This mechanical working can be done either by pressing or by rolling or by drawing or by a sequence of these operations. The finished rod will contain exactly the percentage of flux given to the ingot.

When several cavities have been provided in the ingot during casting, they should be disposed conformably to a circle or otherwise regularly in the section of the rod so as to ensure a uniform distribution of the flux in its interior.

It is advantageous to carry out the transformation of ingots to rods in the heat at least at the beginning of the sequence of mechanical operations chosen for the working mentioned above.

According to the metal or alloy the ingot may be advantageously worked at a temperature at which the flux is still pulverulant, this temperature being maintained during the transformation of the ingot to rods.

This transformation may also take place at a temperature in the fusion interval of the constituents of the flux.

The method in accordance with the invention is illustrated schematically in the accompanying drawings in which Fig. 1 is an axial section through an ingot having a tapered axial hole filled with pulverent flux material; Fig. 2 is a cross-section of the ingot shown in Fig. 1; Fig. 3 is a longitudinal section through a furnace and illustrates schematically the heating of the ingots; and Fig. 4 is a longitudinal section through an extrusion press illustrating schematically the extrusion of the ingots.

The following examples for carrying out the invention have given good results.

Example 1

A pure-aluminum cylindrical ingot of 150 mm. of diameter and 250 mm. of length, provided with an axial hole having the shape of a truncated cone with a diameter of 25 mm. at its small and of 35 mm. at its large base and filled with flux, was heated to 400° C. and extruded. The temperature was maintained between 380 and 400° C., the fusion interval of the flux being from 420 to 600° C. The flux was therefore pulverulant during the pre-heating and the extruding. The rod, intended for the welding of aluminum and aluminum alloys, was brought to the required final diameter by cold drawing. It had then a central core made from flux and could be used alone, that is to say, without any separate flux.

Example 2

A cylindrical cast ingot of an aluminum-silicon-alloy with 4% silicon, having a diameter of 150 mm. and a length of 250 mm. and provided with a conical hole filled with a flux having a fusion interval from 560 to 630° C., was preheated to 500° C. and extruded between 480 and 500° C., that is to say, at a temperature at which the flux was still pulverulant.

The diameter of the extruded rod was 30 mm.

It was brought afterwards to 12 mm. by cold rolling. After an intermediate annealing at about 350° C., the rod was brought to its final diameter by cold drawing.

Such a rod is also intended for the welding of aluminum and aluminum alloys, but can also be used for the brazing of pure aluminum.

*Example 3*

A cylindrical cast ingot of 60 mm. of diameter and 150 mm. of length, made from an aluminum-silicon-alloy with 4% silicon and provided with an axial hole having the shape of a truncated cone with a diameter of 8 mm. at its small and of 10 mm. at its large base, was pre-heated to 500° C. and extruded, this temperature being maintained during the extruding. The fusion interval was from 410 to 600° C., so that the pre-heating and the working were carried out in that interval, that is to say, that a part of the flux was then molten. The final diameter of the welding rod, obtained in one operation in the extrusion press, was 8 mm. The possible uses of such a rod are the same as in the second example.

If one heats the ingot above the melting point or the fusion interval of the flux, the extruding must be carried out at a temperature at which the flux does not yet offer a too great resistance to its distribution in the interior of the rod. If the flux is introduced in the molten state, the extruding must be done at a temperature ensuring the plasticity or the fluidity of the flux.

The relation between the temperatures of heating, of the flux and of the hot working is especially important in the manufacture of welding or brazing rods from aluminum or aluminum alloys.

It was found that in carrying out the method according to the invention, the distribution of the flux in the interior of the rods is done in a particularly advantageous manner if the ingot, into which the flux has been introduced, is extruded. In certain cases it is advantageous to provide the ingot with a conical central hole, to fill that hole with a flux, then to introduce the ingot into the container of the extrusion press in such a manner that the narrow end of the conical hole is turned against the extrusion die. This method allows to ensure a constant ratio between the cross section of the rod and that of the flux on the whole length of the rod.

It was found also that it is advantageous if the cross section of the opening of the extrusion die be equal to or larger than the cross section of the flux-containing hole of the rod; if the ingot is provided with a conical central hole, it is sufficient to comply with this condition with regard to the narrow end of the hole.

For manufacturing a welding or brazing rod according to the new process, one may for example proceed as follows:

After having provided the cast ingot with a hole by means of a metallic or non-metallic core disposed in the ingot mold (the hole should not go through the whole length of the ingot, in order to avoid the necessity of closing two openings after having introduced the flux) and eventually after having submitted the ingot to a preparatory plastic deformation for giving it more consistency or for bringing it to a shape corresponding better to the container of the press, one introduces a flux, preferably in the pulverulant state, into the hole of the ingot. One closes then the opening of the hole in any suitable way, heats the ingot and introduces it in the heat into the extrusion-press. If one utilizes a vertical extrusion press, it is not always necessary to close the opening of the hole; of course, the opening must be then at the top when the ingot is introduced into the press. It is advantageous to heat the ingot only below the melting point of the flux. The fluxes are often made of several substances which do not melt at the same temperature. In this case, one heats the ingot only below the fusion interval of the flux. The working conditions may be for instance the following:

*Example 4*

Pure aluminum:
Diameter of the cast ingot _____ mm__ 150
Length of the cast ingot _____ mm__ 250
Diameter of the conical hole ____ mm__ 25 to 35
Thickness of the bottom of the conical hole
 (at the narrow end) _____ mm__ 10
Fusion interval of the flux _____ °C__ 420 to 600
Pre-heating temperature of the cast ingot
 after introduction of the flux _____ °C. 400
Extruding temperature _____ °C__ 380–400
Diameter of the extruded rod _____ mm__ 30

This rod is brought to its required final diameter by cold drawing and serves as welding rod for aluminum and aluminum alloys.

*Example 5*

Aluminum-silicon-alloy with 4% silicon:
Diameter of the cast ingot _____ mm__ 150
Length of the cast ingot _____ mm__ 250
Diameter of the conical hole ____ mm__ 25 to 35
Thickness of the bottom of the conical hole
 (at the narrow end) _____ mm__ 10
Fusion interval of the flux ____ °C__ 560 to 630
Pre-heating temperature of the cast ingot
 after introduction of the flux in the pulverulant state _____ °C__ 500
Extruding temperature _____ °C__ 480–500
Diameter of the extruded rod _____ mm__ 30

The diameter of this rod is reduced to 12 mm. by cold rolling. Thereafter the rod is intermediarily annealed at about 350° C. and then brought to the final diameter by cold drawing. Such a rod can be used for welding aluminum and its alloys as well as for brazing pure aluminum.

*Example 6*

Aluminum-silicon-alloy with 4% silicon:
Diameter of the cast ingot _____ mm__ 60
Length of the cast ingot _____ mm__ 150
Diameter of the conical hole ____ mm__ 8 to 10
Thickness of the bottom of the conical hole
 at the narrow end _____ mm__ 7
Fusion interval of the flux ____ °C__ 410 to 600
Pre-heating temperature of the cast ingot
 after introduction of the flux in the pulverulant state _____ °C__ 500
Extruding temperature _____ °C__ 480–500
Diameter of the extruded rod (final diameter
 of the welding rod) _____ mm__ 8

The possible uses of this rod are the same as in the 5th example.

If the rod obtained by extrusion has not the final diameter of the welding or brazing rod, its diameter will be reduced either by rolling or by drawing or by a combination of these operations.

By way of summarizing the foregoing examples, it will be seen that the mean diameter of the tapered axial hole in the ingot is from 15% to 20% of the outside diameter and that the taper amounts to from 1% to 4%. The diameter of the extrusion die is approximately equal to the diameter of the hole so that the extrusion produces a reduction in diameter to approximately 15% to 20% of the outside diameter of the original ingot.

The method described above is schematically illustrated in the accompanying drawings. Figs. 1 and 2 show an aluminum ingot 1 having a tapered axial hole 2 filled with the pulverant flux material. The hole extends axially substantially the full length of the ingot but is closed at its smaller end, as indicated at 3. The heating of the ingots is illustrated schematically in Fig. 3 which shows a number of the ingots in a furnace 4. The extrusion of the ingot to form a welding rod is illustrated schematically in Fig. 4 which shows an extrusion press 5 having an extrusion die 6, cylinder 7 and a piston or plunger 8 which is shown by way of example as being operated hydraulically by a cylinder 9 and piston 10. The welding rod produced by extrusion of the ingot 1 is indicated at 11 and comprises a hollow aluminum rod, the cavity of which is filled with the pulverant flux material. The term "aluminum" is used to include pure aluminum as well as aluminum alloys.

The present invention thus provides a novel method of making welding rods and the like which is quick, inexpensive and requires a minimum amount of equipment and floor space. It will be understood by those skilled in the art that the invention is not limited to the specific examples herein described and illustrated.

What I claim is:

1. In a method of manufacturing welding rods from aluminum, providing a cast aluminum ingot with a tapered central axial hole extending substantially the full length of the ingot and having a mean diameter approximately 15% to 20% of the outside diameter of the ingot, the taper of said hole being of the order of 1% to 4%, filling said hole with pulverant flux material having a fusion point below that of the metal of the ingot, confining said pulverant flux material in said hole, heating said ingot to a temperature below the fusion point of said flux material, and extruding said composite ingot and pulverant mass by forcing it through a die the extrusion section of which is approximately equal to the diameter of said hole, the ingot being forced through said die with the smaller end of the axial hole first, thereby producing a reduction in diameter to approximately 15% to 20% of the outside diameter of the original ingot.

2. In a method of manufacturing welding rods from aluminum, providing a cast aluminum ingot with a tapered central axial hole extending substantially the full length of the ingot and having a mean diameter approximately 15% to 20% of the outside diameter of the ingot, the taper of said hole being of the order if 1% to 4%, filling said hole with pulverant flux material having a fusion point in the range of 410° C. to 630° C., confining said pulverant flux material in said hole, heating said ingot to a temperature above 380° C. but below the fusion point of said flux material, and extruding said composite ingot and pulverant mass by forcing it through a die the extrusion section of which is approximately equal to the diameter of said hole, the ingot being forced through said die with the smaller end of the axial hole first, thereby producing a reduction in diameter to approximately 15% to 20% of the outside diameter of the original ingot.

JEAN ROCHAT.

REFERENCES CITED

The following references are of record in the file of this patent:

UNITED STATES PATENTS

| Number | Name | Date |
|---|---|---|
| 74,613 | Shaw | Feb. 18, 1868 |
| 400,869 | Norton et al. | Apr. 2, 1889 |
| 1,980,716 | Colwell | Nov. 13, 1934 |
| 2,435,800 | Sawhill et al. | Feb. 10, 1948 |

FOREIGN PATENTS

| Number | Country | Date |
|---|---|---|
| 481,494 | Great Britain | Mar. 11, 1938 |
| 625,404 | France | Apr. 23, 1927 |